United States Patent [19]
Pfeiffer et al.

[11] Patent Number: 5,474,412
[45] Date of Patent: Dec. 12, 1995

[54] FLOW RACK SYSTEM

[76] Inventors: Harold Pfeiffer, 17 Bobwhite Ct., Forked River, N.J. 08731; Frank J. Neuwirth, R.D. #1, Box 358A, Wall, N.J. 07719

[21] Appl. No.: 14,299

[22] Filed: Feb. 5, 1993

[51] Int. Cl.[6] ............................................ B65G 13/00
[52] U.S. Cl. .......................... 414/276; 193/35 R; 211/187
[58] Field of Search ........................... 414/267, 276; 193/35 R; 211/151, 162, 187, 190–192

[56] References Cited

U.S. PATENT DOCUMENTS

| 2,969,863 | 1/1961 | Woldring et al. | 193/35 R |
| 3,726,376 | 4/1973 | Gotham et al. | 193/35 R |
| 3,744,610 | 7/1973 | Tabler | 193/35 R |
| 3,869,031 | 3/1975 | Coleman et al. | 193/35 R |
| 3,894,634 | 7/1975 | Gotham et al. | 211/150 |
| 3,900,112 | 8/1975 | Azzi et al. | 193/35 R X |
| 3,924,718 | 12/1975 | Kornylak | 193/35 R |
| 4,394,910 | 7/1983 | Miller | 211/151 X |
| 4,453,641 | 6/1984 | Rasmussen et al. | 211/187 X |
| 4,462,500 | 7/1984 | Konstant et al. | 414/276 X |
| 4,765,493 | 8/1988 | Kinney | 193/35 R X |
| 4,790,707 | 12/1988 | Magretta et al. | 414/276 |
| 5,090,547 | 2/1992 | Schäfer | 193/35 R |
| 5,115,920 | 5/1992 | Tipton et al. | 211/187 X |
| 5,295,591 | 3/1994 | Slater | 211/187 X |

FOREIGN PATENT DOCUMENTS

| 8604881 | 8/1986 | WIPO | 414/276 |

*Primary Examiner*—Michael S. Huppert
*Assistant Examiner*—James W. Keenan

[57] ABSTRACT

The present invention features a universal flow rack system that can be affixed to almost any supporting frame or pallet rack. The flow rack system of the invention features a flow track that is "snap-locked" into place upon the storage frame in an almost instantaneous fashion. This allows for quick assembly, adjustment and removal of the flow track at any time. The flow rack system is positionable about the storage frame or pallet rack in any orthogonal position (X and Y axes) about the horizontal plane of the frame, thus allowing for overhangs and unique positioning thereupon.

12 Claims, 4 Drawing Sheets

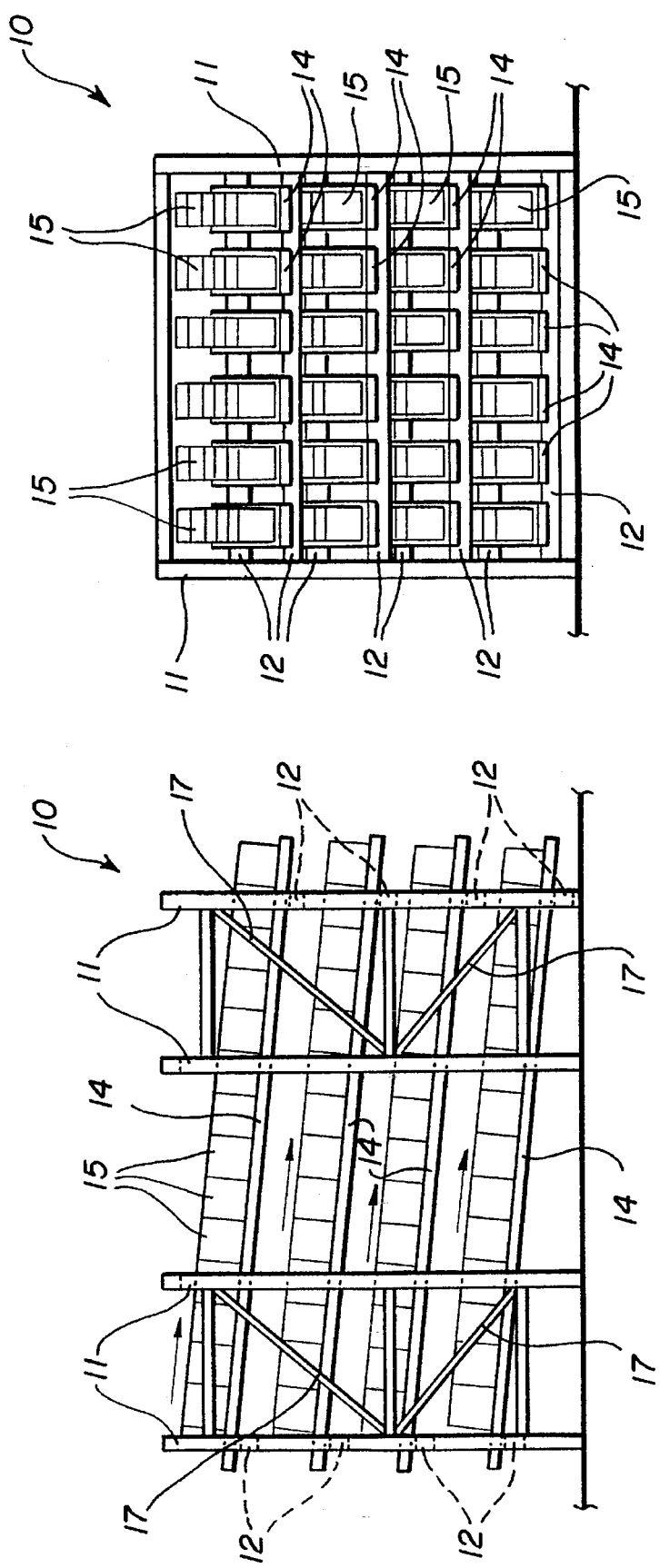

ARM IN LOCK POSITION "B"

FLOW RACK SYSTEM

FIELD OF THE INVENTION

The present invention pertains to material storage racks, and, more particularly, to a flow rack storage system that is universally adaptable to any skeletal storage frame without needing to provide intermediate supports, shelves or pallet racks. The flow rack system of this invention is also uniquely snap-action assembled to any frame; it requires no tools and provides an almost instantaneous capability for mounting, rearrangement and removal.

BACKGROUND OF THE INVENTION

The storage of materials in warehouses, commercial facilities and industrial plants constitutes a process that is ubiquitous and often inefficient.

The object of any storage scheme is to provide high-density storage within a facility and handling boxes and other storage materials with dispatch. It is common to find narrow aisles in warehouses to maximize the space that is devoted to storage frames and racks.

Recently, it has been found advantageous to convert pallet racks and other ordinary shelving to flow-through shelves, in order to provide for the gravity flow movement of materials to a far end of a storage tier.

The conversion of various tiers of a storage frame to a flow system is fraught with many installation problems and operative complications. The ultimate benefit, however, of flow rack storage has, throughout the industry, prompted a disregard for any drawbacks posed by conversion difficulties.

One popular current methodology involves the mounting of flimsy, poorly supportive rails that contain a series of plastic wheels or rollers. This is a commonly used system by dint of its low cost. The major problem encountered therewith, however, is the system's relatively short operative life. The plastic wheels or rollers cannot (by themselves, or even in combination) provide the support necessary for moderate and heavy loads. As a result of their poor structural support, such rails often cannot be fixtured in lengths greater than two or three feet and are commonly supported by a shelf or other closely-spaced support structure.

Lifetime guarantees are commercially offered as an incentive to overlook the inability of this type of system to provide good operability. Therefore, the economy of this system that is originally perceived is, in actuality, deceptive. This type of system frequently requires replacement, which more than counterbalances any initial savings.

Another drawback of such a system is that the rails often require the addition of extraneous support members about the frame, so as to provide the carrying capacity that they so clearly lack.

It is, therefore, surprising that this art, which features a myriad of systems and is such a pervasive part of commercial intercourse, has not, until this invention, produced an efficient flow rack system. It is obvious to all those skilled in this art that there has been a long-felt need to develop such a system.

The objectives required of a good flow rack system can be enumerated in order of importance, as follows:

1) The system must be inexpensive.
2) It should require minimal assembly.
3) The system should furnish the requisite structual support to carry heavy loads.
4) It should have a long operative life.
5) The system should have adjustability, so as to adapt to changing products and needs.

The current invention not only provides all of the necessary aforementioned requirements of a good flow rack system, but it also is actually equivalent to or lower in cost than the light-gauge members with plastic wheel-rail system.

The invention is universally adaptable to almost any frame or support structure.

The flow rack of this invention will support heavy loads without the need for adding extraneous bracing or intermediate support members to the frame or individual pallet racks.

The inventive flow rack system requires minimal assembly. Two retainer bars are fixtured to distal ends of a pallet rack or frame. This is the only structural assembly required. After the retainer members are in place, the flow-track member of the system is placed into the retainer bars, which are now part of the frame. The flow-track member can be placed upon the retainer members in any position along X and Y axes in the horizontal plane. This feature allows the flow-through span to provide overhang possibilities. The flow-track member is dropped into place anywhere along the retainer bars; it is snap-locked into place by means of a simple turn of a locking pin. This snap-lock assembly allows for easy installation and removal, as well as the instantaneous modification of the system at any time.

The present invention is so simple in its concept, but it has often been observed that major inventions often appear to be simpler in design than their counterparts. Such is believed to be the case of the current flow rack system.

DISCUSSION OF RELATED ART

In U.S. Pat. No. 3,894,634, issued to Gotham et al on Jul. 15, 1975, entitled DISPLAY AND DELIVERY STAND, (owned by a common assignee), a display frame featuring a number of tiers containing flow tracks is illustrated. The display shelves comprise roller-conveying tracks which provide a flow-through function. A tooth-like mounting support on each display shelf allows for the positioning of the display support anywhere about the frame along a single horizontal axis and a vertical axis.

By contrast, the present invention features a flow track that rigidly mounts to a tooth-containing mounting (or retainer) bar disposed horizontally across and between the frame members. The current invention does not require specially-constructed frame supports to accommodate shelf placement. It is universally adaptable to any frame or pallet rack system for conversion therefrom to a flow-through system.

As one element of its flow rack system, the present invention features a flow track that is constructed in a way that is similar to that known as the Convey Assembly shown in U.S. Pat. No. 3,726,376, issued to Gotham et al on Apr. 10, 1973, and owned by a common assignee. The flow track of the present invention, however, has been modified to accommodate the placement of a locking pin through the support rails along its horizontal length. The current invention features apertures (placed at regular intervals) in the support rails for insertion of a locking pin therethrough.

The current invention was further modified to increase span capacity. It was further modified to include a terminal member to facilitate loading, as well as a terminal member to act as an end stop. This allows the track to be complete and independent of shelves, intermediate supports or other added terminal fixtures.

SUMMARY OF THE INVENTION

In accordance with the present invention, there is provided a universal flow rack system that can be fixtured to almost any supporting frame and pallet rack. The flow rack system of the invention features a flow track that is "snap-locked" almost instantaneously into place upon the storage frame. This allows for the quick assembly and removal of the flow track at any time. The flow rack system is positionable about the storage frame or pallet rack in any orthogonal position (X and Y axes) about the horizontal plane of the frame, thus allowing for overhangs and unique positioning thereupon.

The flow rack system of this invention features three simple parts: (1) a flow-track conveyor having a span of about ten to twelve feet; (2) a retainer bar or retainer that fastens to the support frame, and upon which the flow track is snap-locked into place; and (3) a simple, elongated locking pin that is placed through the flow-track rails at one end of its span, and which secures the flow track to the retainer bar. This securement provides locking against movement in all three orthogonal planes, i.e., the X, Y and Z axes.

For the purpose of definition, the term "snap-lock" shall mean any quick-acting, quick-release mechanism for securing a flow track, as herein illustrated, to the supporting beams or pallet rack of a storage frame. "Snap-lock" may also be defined as that locking mechanism requiring no tools to effect the aforementioned securement.

The flow-track conveying member of the above mentioned assembly comprises rollers having no internal springs (often common in this art). The springs have been found to cause additional friction and wear, as well as being the introduction of an additional, unnecessary expense in manufacture.

Each tier of the storage frame can be fitted with one or more of the flow tracks along the horizontal (X-axis) width thereof, as befits the need for support of the particular loads being conveyed. In this fashion, the flow rack system of this invention can be custom-designed for a storage facility's needs. The flow tracks of this invention are strong and provide a long operative life, despite their low cost of manufacture.

It is an object of this invention to provide an improved flow rack system.

It is another object of the invention to provide a flow rack system that is universally adaptable to almost any support frame and pallet rack.

It is still another object of this invention to provide a flow rack system that provides almost instantaneous assembly.

It is a further object of the invention to provide a flow rack system of low cost.

It is yet a further object of this invention to provide a flow rack conveying and storage system that is easily adjustable and that can be secured upon a storage frame or pallet rack without the need for tools.

It is still another object of the invention to provide a system that requires neither the purchase nor the installation of specific framework, towers or beams, a system that can be universally installed in almost any currently marketed pallet rack or wide-span rack structure.

BRIEF DESCRIPTION OF THE DRAWINGS

A complete understanding of the present invention may be obtained by reference to the accompanying drawings, when considered in conjunction with the subsequent detailed description, in which:

FIG. 1 is a side view of a typical tier-type storage frame commonly found in warehouses and other material storage facilities;

FIG. 2 is a front view of the storage frame illustrated in FIG. 1;

DESCRIPTION OF THE PREFERRED EMBODIMENT

Generally speaking, the invention features a flow track comprising a plurality of periodically-spaced rollers, upon which materials can be conveyed from one position to another on the span. The rollers are rotatively supported between two rails or channels defining the flow track. The flow track is positionable between two end support beams of a storage frame or pallet rack, with each beam supporting a retainer bar. The flow track is adjustably positionable, using the retainer bars, about the horizontal plane defined by X and Y axes. A locking pin running through the rails or channels of the flow track at one end rigidly affixes the flow track to the frame, once a desired position has been set. The locking pin is rotated between an adjustable position and a locking position respectively ahead of and behind the retainer bar attached to said support beam.

For the sake of brevity and clarity, like elements and components throughout the following detailed description shall bear identical designations in the FIGURES.

Now referring to FIGS. 1 and 2, a typical tier-type storage frame 10 found in warehouses and other material storage facilities is shown in respective side and front views. This type of storage frame can accommodate the flow rack of the present invention. The frame 10 is comprised of vertical support members 11 and horizontal support end bars 12. The flow racks 14 of the invention are shown in situ as they span across the support end bars 12 of the frame 10. The end support bars 12 can support a number of flow racks 14 on each tier, as illustrated in FIG. 2. Boxes 15 and other materials are carried by the flow racks 14 in each tier, as illustrated. Braces 17 can be used to structurally enhance the rigidity of the frame 10, as shown in FIG. 1.

Figure 3:
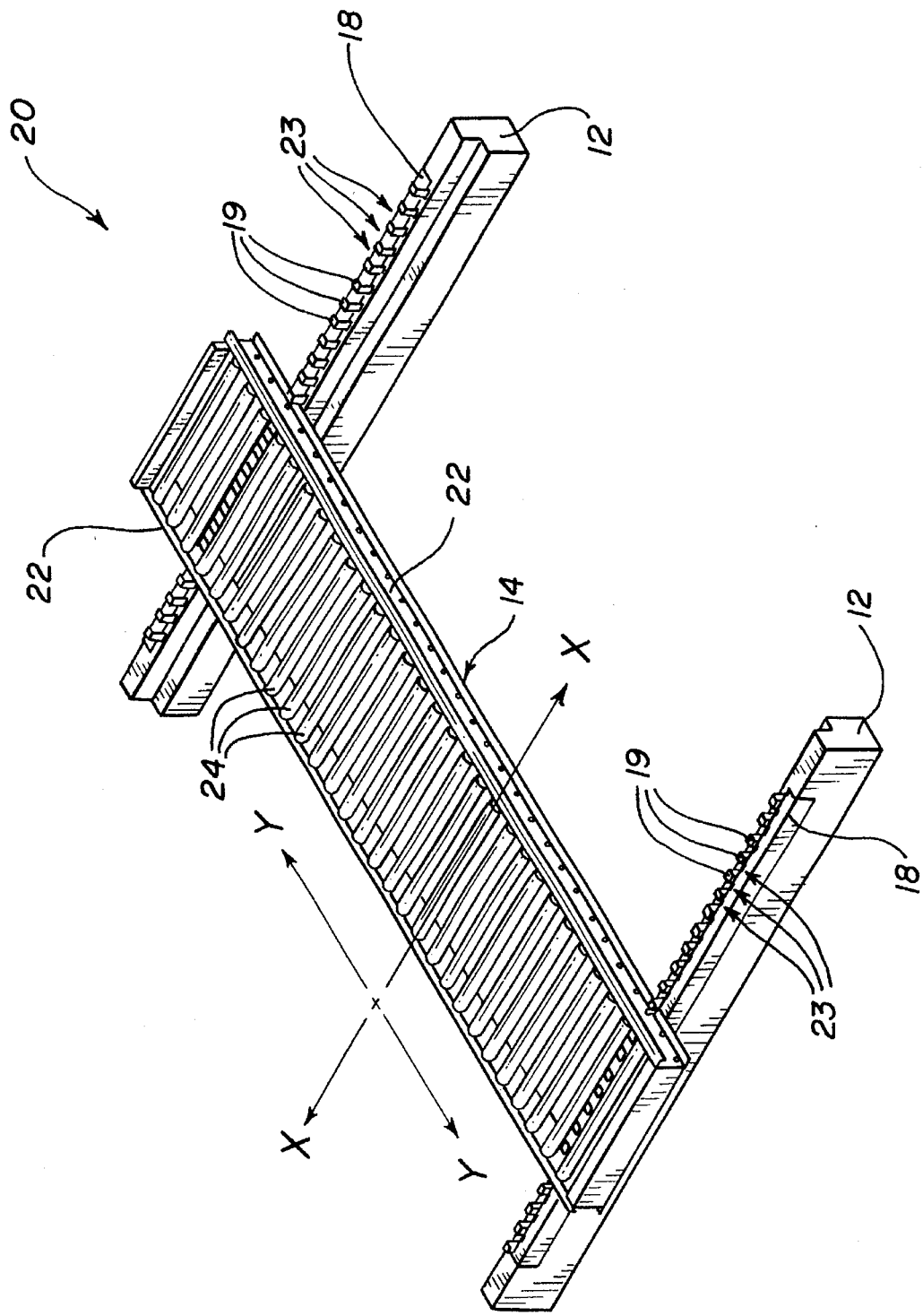
FIG. 3 is a perspective view of a typical flow rack system mounted upon the storage frame of FIGS. 1 and 2, in accordance with the invention.
Figure 6:
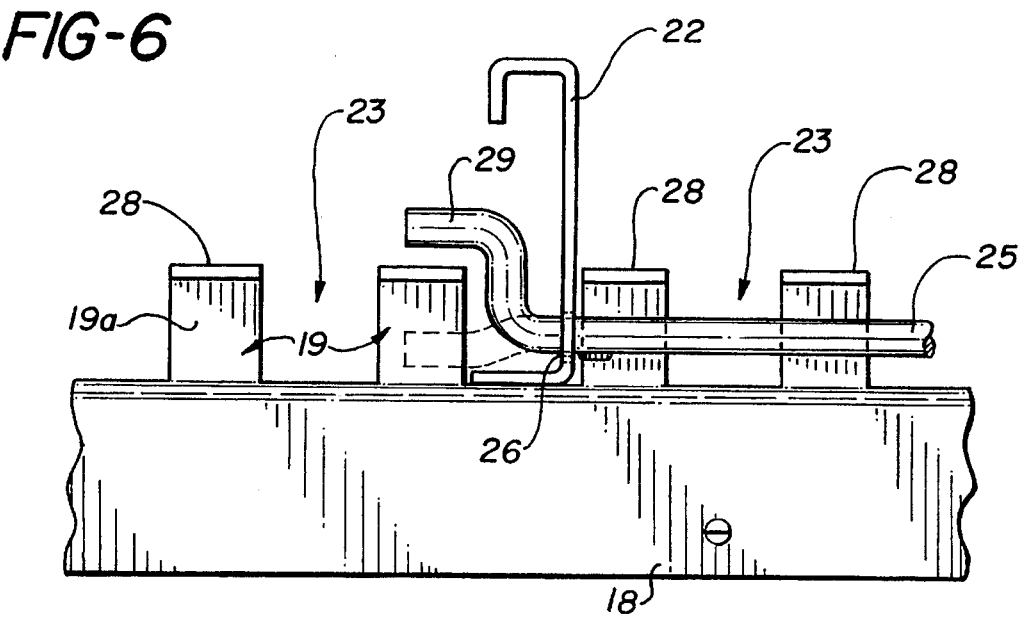
FIG. 6 is a frontal view of the adjustment and locking mechanism illustrated in FIGS. 4 and 5.

Referring to FIG. 3, a perspective view of the flow rack system 20 of this invention is illustrated. The flow rack system 20 comprises flow track 14, which is supported on the support end bars 12 of frame 10, as aforementioned. The flow rack system 20 also comprises two retainer bars or retainers 18 that are respectively mechanically fastened to each support end bar 12, disposed on distal ends of frame 10. This is the only part of the inventive methodology that requires the use of tools. The retainer bars 18 have a number of teeth 19 laterally disposed along their length. The flow track 14 has periodically-spaced rollers 24, rotatively supported upon side rails or channels 22. The rails or channels 22 of the flow track 14 are placed in the spaces or wells 23 defined by the teeth 19. (See FIGS. 4 and 6 for a more detailed view.) The flow track 14 can be placed and supported in any of the wells 23 of the respective retainer bars 18 with complete horizontal freedom, i.e., the flow track 14 is movable along the horizontal plane in both the X and Y axes, as illustrated by the arrows. In this fashion, the flow-track system 20 of the invention can provide a customized installation, which also includes overhangs, as aforementioned. As many flow tracks 14 can be placed in, and be supported by, the retainers 18 as can be carried along the retainer bar width, as previously illustrated in FIG. 2.

Figure 4:
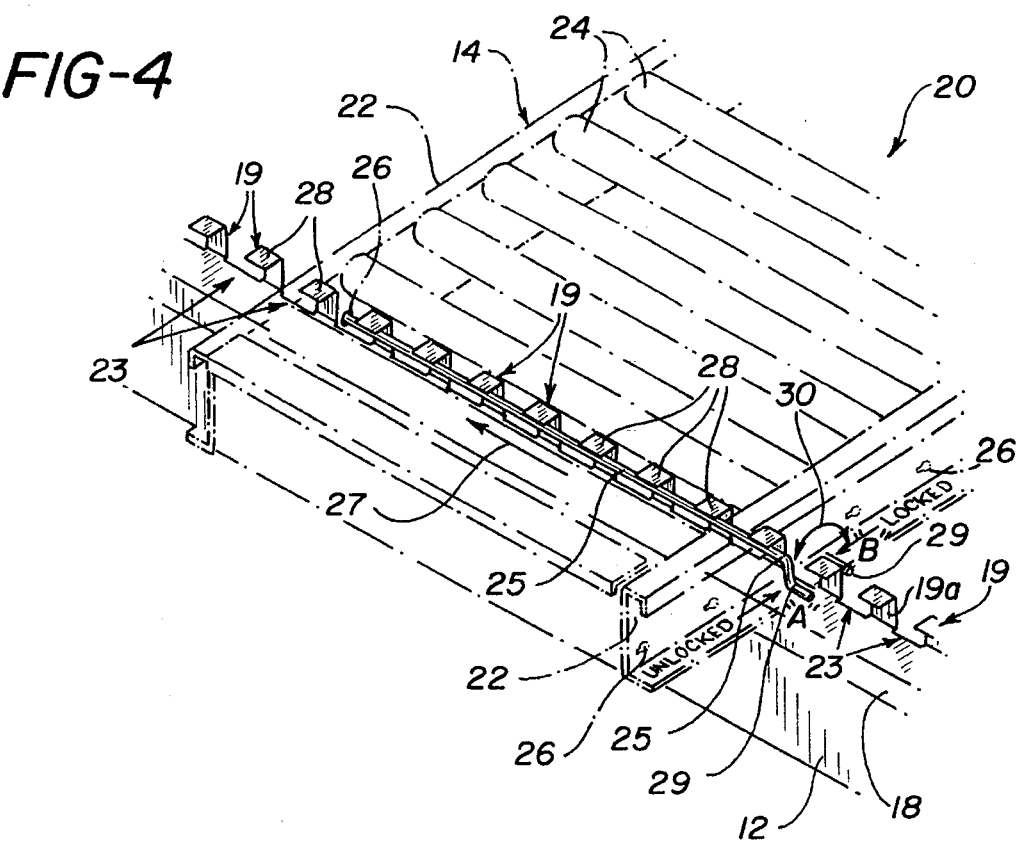
FIG. 4 is an enlarged, perspective view of the adjustment and locking mechanism of the flow rack system of this invention.
Figure 4A:
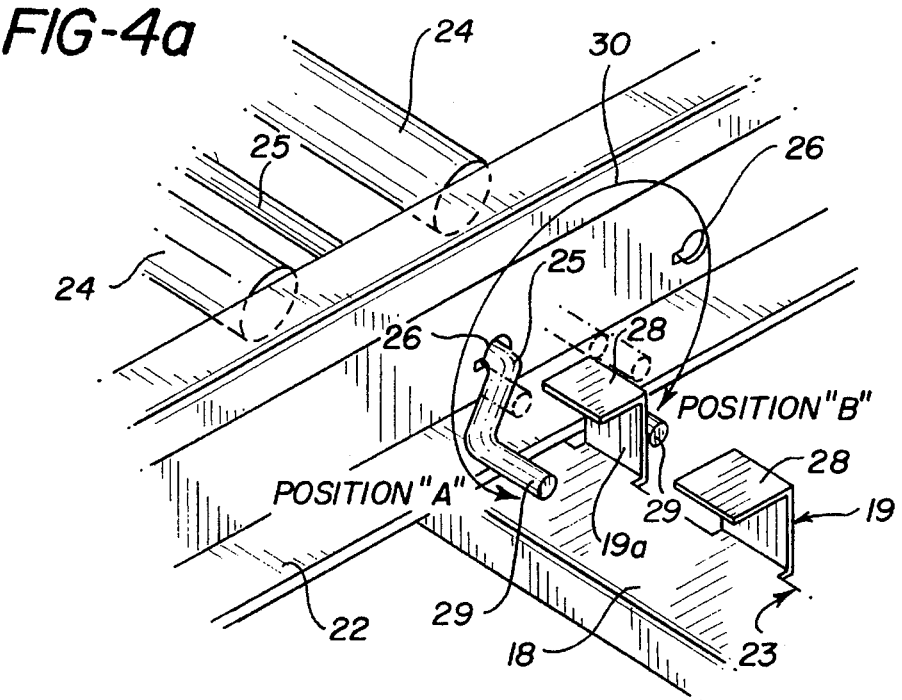
FIG. 4a is a further enlarged perspective view of the adjustment and locking mechanism illustrated in FIG. 4.
Figure 5:
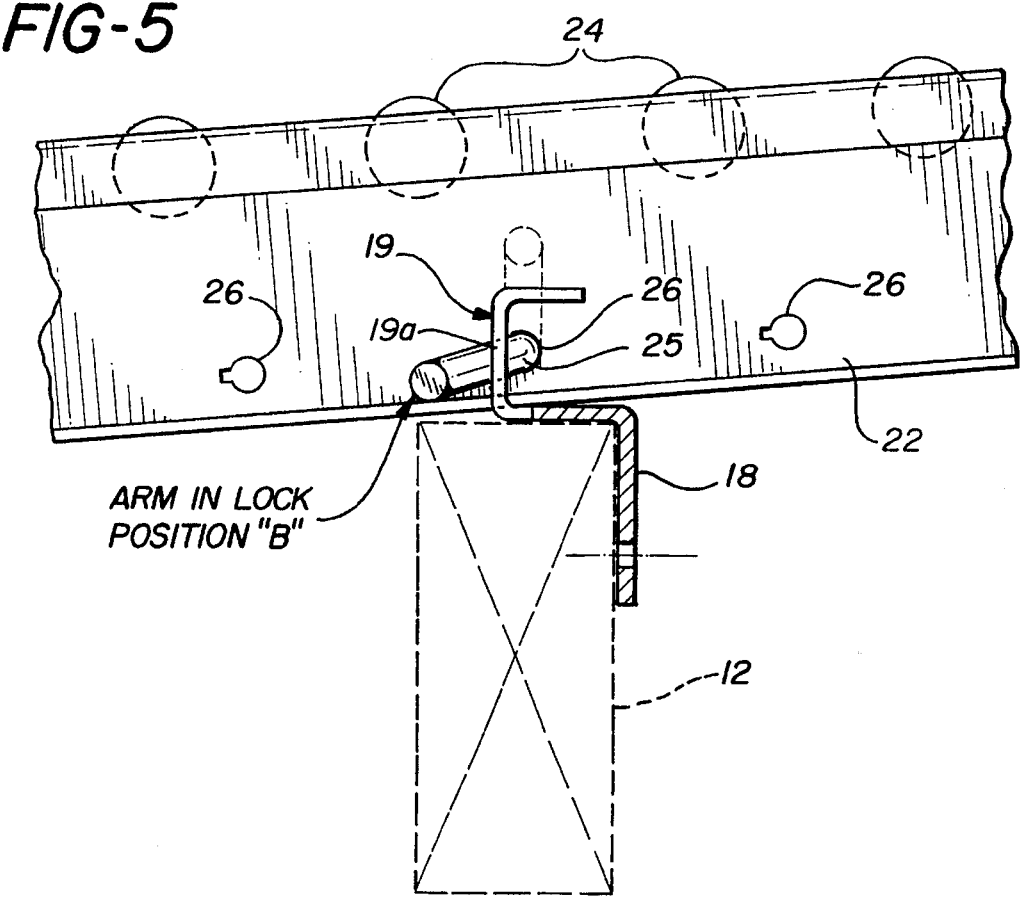
FIG. 5 is a side view of the adjustment and locking mechanism depicted in FIG. 4.

Referring to FIG. 4, an enlarged view of one end of the flow rack system 20 of this invention is shown. Once the desired position of the flow track 14 is decided, it can be quickly locked into place by means of a locking pin 25. Reference is also made to FIG. 4a, which features an additional enlargement of the locking pin 25 and its unique "snap-lock" function. The rails 22 of the flow track 14 include a number of uniformly spaced apertures 26, as can also be seen with reference to FIG. 5. These apertures 26 are provided for the insertion and placement of the locking pin 25. The locking pin 25 is inserted into the appropriate aperture 26 in the right-hand side rail 22 and pushed across (arrow 27) the width of the flow track 14 and through the corresponding aperture 26 on the opposite side rail 22. Teeth 19 (each having a horizontal bend at the top) form flanges 28. These flanges 28 capture and hold the locking pin 25 against vertical movement. The locking pin 25 comprises a dog-leg bend, which forms a handle 29.

In FIGS. 4 and 4a, the locking pin 25 is shown in an unlocked position "A", with its handle 29 positioned ahead of the teeth 19. The handle 29 of locking pin 25 is "snap-locked" into a locked position "B" by rotating it through the arc defined by arrows 30. When the handle 29 of locking pin 25 is rotated to the locked position "B", it is observed that the flow track 14 cannot be moved or withdrawn from the retainer bar 18 along the axis defined as Y, in FIG. 3. This locking is due to the handle 29 abutting against the adjacent tooth 19a. Neither can the flow track 14 be moved along the lateral axis X, once the rails 22 have been placed in the particular wells 23 defining its adjusted position along the X axis. The flow track 14 is now held firmly in place on all of the orthogonal (horizontal and vertical) axes X, Y and Z.

The term "snap-lock", as previously defined herein, is meant to express the uniqueness of the invention. Once adjusted to a desired position with respect to the support bar 12 and retainer bar 18, the flow track is quickly and easily secured, so that its position becomes fixed. However, at any time, the flow track 14 can just as easily be removed by reversing the handle 29 to its unlocked position "A". The ease by which the flow track 14 can be adjusted and locked in place is the essence of the term "snap-lock" as used herein. The term "snap-lock" also defines a locking system that requires no tools to provide adjustment or locking.

The system is inexpensive to manufacture, as well as to install. The flow track 14 comprises strong structural rails 22 and strong and smoothly running, rotatively-supported rollers 24.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A flow rack system that is universally accommodated to a variety of storage supports having horizontally fixed distal ends, comprising:

a flow-track conveyor member having elongated side rails, a series of conveying elements disposed between and along said elongated side rails, said elongated side rails having means for supporting a locking pin;

a pair of spaced-apart retainer bars, each one of said pair of retainer bars being mountable upon said horizontally fixed distal ends of said storage supports, said retainer bars having means for supporting at least one flow-track conveyor member therebetween against horizontal movement on at least one axis along a horizontal plane thereof; and a locking pin, positioned upon one end of a storage support, said locking pin carried by said flow-track conveyor member for rigidly locking said flow-track conveyor member with respect to a said retainer bar and said storage support against movement on all orthogonal axes thereof.

2. The flow rack system in accordance with claim 1, wherein said flow-track conveyor member further comprises a plurality of elongated rollers substantially evenly spaced along said elongated side rails and rotatively supported thereby.

3. The flow rack system in accordance with claim 1, wherein said retainer bars each have a series of teeth defining spaces for placement therein of said side rails of said flow-track conveyor member.

4. The flow rack system in accordance with claim 1, wherein said flow-track conveyor member has means defining a number of periodically-spaced apertures in said elongated side rails for insertion of said locking pin at a distal end thereof.

5. The universal flow rack system of claim 4, wherein said conveying member comprises an elongated span of spaced-apart rollers rotatably supported upon said elongated, spaced-apart side rails.

6. A universal flow rack system having at least one conveying member disposed on at least one tier of a storage support, said conveying member having elongated, spaced-apart side rails, a series of elongated conveying elements disposed between and along said elongated, spaced-apart side rails, said elongated, spaced-apart side rails having means for supporting a rotatable locking pin for rotatively locking said conveying member in a horizontal tier position, said conveying member being freely movable in a horizontal plane about said tier in an adjustment position, but rigidly locked into place in a locking position upon said storage support against movement on all orthogonal axes by a locking means including said rotatable locking pin, said rotatable locking pin supported by and disposed between said conveying member and said storage support, said rotatable locking pin being rotatively movable between said locking position and said adjustment position, whereby said conveying member can be freely adjusted upon said tier, without the need for tools, and then locked in place by said 7. A universal flow rack system for mounting upon a horizontal plane of a storage support having fixed distal ends, comprising at least one elongated conveying member disposed between said fixed distal ends of the storage support, said conveying member having elongated, spaced-apart side rails, a series of elongated conveying elements disposed between and along said elongated, spaced-apart side rails, said elongated, spaced-apart side rails supported upon spaced-apart, horizontally disposed retainer bars mountable to said storage support on said fixed distal ends thereof, said retainer bars comprising a number of spaced-apart teeth that define wells for supporting said elongated, spaced-apart side rails, said wells for supporting and positioning said conveying member in a horizontal tier position, said conveying member providing a flow capability for said flow rack system, adjustable mounting means for adjustably mounting said elongated conveying member anywhere about said horizontal plane of said storage support including, but not limited to, overhang positions with respect to said storage support, said adjustable mounting means including adjustable, snap-lock locking means, whereby once said conveying member is adjusted to a desired horizontal position about said horizontal plane of said storage support, said adjustable, snap-lock locking means is movable to a locking position to rigidly secure said conveying member in the desired horizontal position.

8. The universal flow rack system in accordance with claim 7, wherein said adjustable, snap-lock locking means is rotatively movable between an adjustment position and a locking position.

9. The universal flow rack system in accordance with claim 8, wherein said adjustable, snap-lock locking means comprises a locking pin that is respectively rotatable between said adjustment position and said locking position.

10. A universal flow rack system for converting a fixed storage support having horizontally disposed distal ends to a material flow storage system, comprising at least one elongated conveying member disposed upon at least one tier of a storage support and a pair of spaced-apart, horizontally disposed retainer bars, each of which is mounted on said horizontally disposed distal ends of said storage support and having a plurality of teeth defining adjustment wells, said elongated conveying member having side rails for securement within said adjustment wells defined by said plurality of teeth disposed upon each of said retainer bars, said conveying member being adjustable about two axes of a horizontal plane with respect to said adjustment wells, said universal flow rack system further comprising a snap-lock member disposed at a distal end of said storage frame and carried by said conveying member for snap-locking said conveying member in an adjusted position with respect to said adjustment wells.

11. The universal flow rack system in accordance with claim 10, wherein said snap-lock member is rotatably disposed with respect to said conveying member for movement between an adjustment position and a locking position.

12. The universal flow rack system in accordance with claim 10, wherein said snap-lock member comprises a locking pin passing through said conveying member at a distal end thereof, said locking pin rotating from said adjustment position to said locking position, which is defined by a number of overhanging flange members carried by said teeth disposed upon said retainer bars, said flange members limiting and locking the movement of said conveying member with respect to said storage support.

* * * * *